United States Patent [19]

Nakano

[11] Patent Number: 4,968,289
[45] Date of Patent: Nov. 6, 1990

[54] CONTINUOUSLY VARIABLE TRACTION ROLLER TRANSMISSION

[75] Inventor: Masaki Nakano, Kawasaki, Japan

[73] Assignee: Nissan Motor Co., Ltd., Yokohama, Japan

[21] Appl. No.: 316,944

[22] Filed: Feb. 28, 1989

[30] Foreign Application Priority Data

Mar. 12, 1988 [JP] Japan .................. 63-59081

[51] Int. Cl.$^5$ .............................................. F16H 15/50
[52] U.S. Cl. ...................... 475/185; 74/193; 74/200
[58] Field of Search .............. 74/796, 193, 200; 475/183, 185

[56] References Cited

U.S. PATENT DOCUMENTS

| | | | |
|---|---|---|---|
| 2,956,441 | 10/1960 | de Brie Perry | 74/200 |
| 3,142,189 | 7/1964 | Davis et al. | 74/200 |
| 3,184,983 | 5/1965 | Kraus | 74/200 |
| 3,430,504 | 3/1969 | Dickenbrock | 74/200 |
| 3,494,224 | 2/1970 | Fellows et al. | 74/200 X |
| 3,820,408 | 6/1974 | Louis | 74/200 |
| 3,820,416 | 6/1974 | Kraus | 74/200 X |
| 4,484,487 | 11/1984 | Kraus | 74/200 |
| 4,576,055 | 3/1986 | Kraus | 74/200 |

FOREIGN PATENT DOCUMENTS

| | | | |
|---|---|---|---|
| 62-127555 | 6/1987 | Japan . | |
| 56926 | 9/1944 | Netherlands | 74/200 |

Primary Examiner—Dwight Diehl
Attorney, Agent, or Firm—Foley & Lardner, Schwartz, Jeffery, Schwaab, Mack, Blumenthal & Evans

[57] ABSTRACT

A continuously variable traction roller transmission. The transmission comprises a casing; input and output shafts passing through the interior of the casing; opposite paired input and output toroidal discs coaxially disposed about the input shaft; paired traction rollers disposed between and in engagement with the input and output discs. The transmission further comprises a first device for connecting the input shaft to the input disc to achieve a united rotation between them and biasing the input disc toward the output disc in accordance with a magnitude of torque applied to the input shaft; a second device disposed between the input shaft and the input disc for constantly biasing the input disc toward the output disc; and a third device for reducing a friction force which is produced between the input disc and the input shaft by the second device when a relative rotation therebetween takes place.

12 Claims, 3 Drawing Sheets

CONTINUOUSLY VARIABLE TRACTION ROLLER TRANSMISSION

BACKGROUND OF THE INVENTION

1. Field of the Invention

The present invention relates in general to continuously variable transmissions, and more particularly to the transmissions of a traction roller type which has paired motion transmitting traction rollers disposed between, and in engagement with, opposite toroidal input and output discs.

2. Description of the Prior Art

Hitherto, various types of continuously variable transmissions have been proposed and put into practical use particularly in the field of motor vehicles. Some of them are of a so-called traction roller type which comprises paired motion transmitting traction rollers disposed between, and in engagement with, opposite toroidal discs mounted on input and output shafts.

Under operation of the transmission, the torque applied to the input toroidal disc from a prime mover (that is, engine) is transmitted through the traction rollers to the output toroidal disc.

During this, the rotation speed change ratio between the input and output discs is infinitely varied depending on the angle at which each traction roller inclines relative to a common axis on which the input and output discs are mounted.

One transmission of such traction roller type is disclosed in Japanese Patent First Provisional Publication No. 62-127555. In this transmission, there are employed both a first biasing mechanism which biases the input and output discs toward each other in accordance with a torque applied to the input disc and a second biasing mechanism which biases the discs toward each other with a constant force. The first biasing mechanism comprises a loading cam structure which is constructed to shift the input disc toward the output disc upon generation of relative rotation between the input shaft (viz., a cam flange secured thereto) and the input disc. While, the second biasing mechanism comprises a pre-loaded spring which is compressed between the input disc and the input shaft (viz., the cam flange) through a spring seat.

However, the transmission of the publication has the following drawback due to the inherent construction of the second biasing mechanism.

That is, due to provision of the pre-loaded spring between the input shaft and the input disc, the relative rotation therebetween, which is required for operating the first biasing mechanism, is affected. In fact, the biasing force produced by the pre-loaded spring causes creation of a significant friction resistance against the relative rotation. This phenomenon tends to retard accomplishment of a locked condition between the input shaft (viz., the cam flange) and the input disc and thus deteriorates the performance of the first biasing mechanism and thus that of the transmission.

SUMMARY OF THE INVENTION

It is therefore an essential object of the present invention to provide a continuously variable traction roller transmission which is free of the above-mentioned drawback.

According to the present invention, there is provided a continuously variable traction roller transmission in which the friction resistance caused by the second biasing mechanism is substantially eliminated or at least minimized.

According to the present invention, there is provided a continuously variable traction roller transmission which comprises a casing; input and output shafts passing through the interior of the casing; opposite paired input and output toroidal discs coaxially disposed about the input shaft; paired traction rollers disposed between and in engagement with the input and output discs; first means for connecting the input shaft to the input disc to achieve a united rotation of them and biasing the input disc toward the output disc in accordance with a magnitude of torque applied to the input shaft; second means disposed between the input shaft and the input disc for constantly biasing the input disc toward the output disc; and third means for reducing a friction force which is produced between the input disc and the input shaft by the second means when a relative rotation therebetween takes place.

BRIEF DESCRIPTION OF THE DRAWINGS

Other objects of the present invention will become apparent from the following description when taken in conjunction with the accompanying drawings, in which.

DETAILED DESCRIPTION OF THE INVENTION

Figure 1:
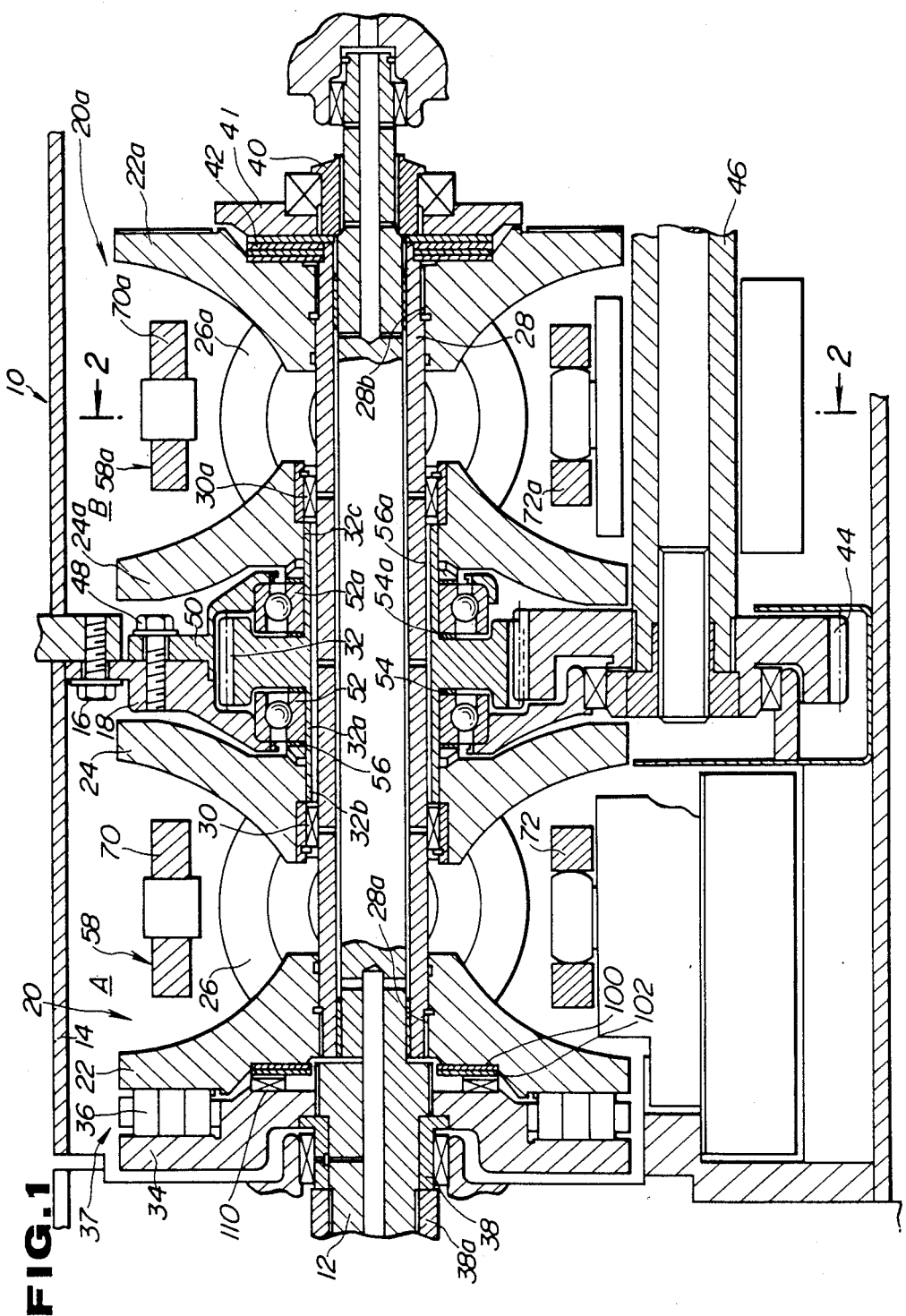
FIG. 1 is a sectional view of a continuously variable traction roller transmission of a first embodiment of the present invention.

Referring to the drawings, particularly, FIG. 1, there is shown a double cavity type continuously variable traction roller transmission 10 which is a first embodiment of the present invention.

A torque converter (not shown) is arranged at left side, as viewed in FIG. 1, of the transmission 10. Designated by numeral 12 is an input shaft which extends from the torque converter. The input shaft 12 is rotatably held by a casing 14. A known measure is employed for permitting a slight axial movement of the input shaft 12 relative to the casing 14 for the reason as will become apparent as the description proceeds.

Designated by numeral 18 is a partition wall which is secured by bolts 16 to the casing 14 thereby to define front and rear cavities A and B in the casing 14.

First and second motion transmitting traction mechanisms 20 and 20a are installed in the front and rear cavities A and B respectively and they are coaxially arranged about the input shaft 12.

The first mechanism 20a comprises a first input toroidal disc 22, a first output disc 24 arranged opposite to the first input toroidal disc 22, and first paired traction rollers 26 which are disposed between and in engagement with the input and output discs 22 and 24. Similar to this, the second mechanism 20 comprises a second input toroidal disc 22a, a second output toroidal disc 24a and second paired traction rollers 26a.

The first input and output discs 22 and 24 and the second input and output discs 22a and 24a are coaxially disposed on a common axis.

The paired traction rollers 26 or 26a are inclinable relative to the common axis of the discs 22, 24, 24a and 22a, so that speed change ratio between the input and output discs 22 and 22a (or, 24 and 24a) is infinitely varied depending on the angle at which the traction rollers incline relative to the common axis.

The first and second output discs 24 and 24a are arranged close to each other in a back-to-back manner with an interposal of the partition wall 18 therebetween, while the first and second input discs 22 and 22a are arranged at a distance from each other.

The first and second input discs 22 and 22a are connected through serrations 28a and 28b to front and rear ends of a hollow torque shaft 28 which is rotatably disposed about the input shaft 12.

The first and second output discs 24 and 24a are rotatably disposed about the torque shaft 28 through respective needle bearings 30 and 30a. An output gear 32 is rotatably disposed about the torque shaft 28 at a position between the first and second output discs 24 and 24a. The output gear 32 has front and rear hub portions 32a to which the first and second output discs 24 and 24a are connected through serrations 32b and 32c.

Thus, the first and second input discs 22 and 22a connected to each other through the torque shaft 28 are rotated together, while, the first and second output discs 24 and 24a connected to each other through the hub portions 32a of the output gear 32 are rotated together.

At an axially outer side of the first input disc 22, there is arranged a cam flange 34 which is connected through serrations (no numeral) to the input shaft 12 to rotate therewith.

A loading cam structure 36 serving as a first biasing means is arranged between the cam flange 34 and the first input disc 22, so that the torque of the input shaft 12 is transmitted to the first input disc 22 through the cam flange 34 and the loading cam structure 36, and at the same time, to the second input disc 22a through the torque shaft 28.

The loading cam structure 36 is constructed to bias the first input disc 22 toward the first output disc 24 in accordance with a torque applied to the input disc 22. That is, during torque transmitting operation, there is produced a relative but slight rotation (or phase shift) between the cam flange 34 and the first input disc 22 causing turning of the cam elements of the loading cam structure 36 about their respective axes. The turning of each cam element widens the clearance between the cam flange 34 and the input disc 22 thereby biasing the latter toward the output disc 24.

Thus, as a torque applied to the input disc 22 increases, the engaging force with which the input and output discs 22 and 24 are pressed against the first paired traction rollers 26 increases.

Between the smaller diameter portions of the respective cam flange 34 and first input disc 22, there are coaxially arranged paired disc springs 100 and 102 which serve as a second biasing means. This biasing means functions to bias the first input disc 22 toward the first output disc 24 with a constant force. Using the paired disc springs 100 and 102 is advantageous in achieving a smaller spring constant. If desired, the paired disc springs may be replaced with a suitable coil spring.

The cam flange 34 is connected to the input shaft 12 through a stopper 38 and a nut 38a, so that respective counterforces from the loading cam structure 36 and the two disc springs 100 and 101 are applied to the input shaft 12.

The second input disc 22a is connected to a right end portion, as viewed in FIG. 1, of the input shaft 12 through a nut 40 screwed to the input shaft 12, a spacer 41 and rotating plates 42.

Thus, the counterforces applied to the input shaft 12 from the loading cam structure 36 and the two disc springs 100 and 102 are transmitted to the second input disc 22a using the input shaft 12 as a power transmitting means, so that the first and second motion transmitting traction mechanisms 20 and 20a are applied with equal biasing forces from the first and second biasing mechanisms.

In accordance with the present invention, there is further employed a needle thrust bearing 110 for eliminating or at least minimizing a friction resistance of the second biasing means (100, 102) to the relative rotation between the cam flange 34 and the first input disc 22. That is, the needle thrust bearing 110 is disposed between the disc spring 102 and the cam flange 34.

Because the first and second output discs 24 and 24a are connected through the serrations 32b and 32c to the output gear 32, the torque transmitted to the first output disc 24 and that transmitted to the second output disc 24a are united at the output gear 32 and then the united torque is transmitted to an output shaft 46 through a drive gear 44 which is meshed with the output gear 32.

As is well shown in FIG. 1, the output gear 32 is received in a space which is defined by both an apertured portion of the partition wall 18 and an apertured auxiliary wall 50 secured by bolts 48 to the partition wall 18. Within the apertures, there are arranged respective angular ball bearings 52 and 52a which are, in turn, coaxially disposed about the front and rear hub portions 32a of the output gear 32. Thus, the output gear 32 is supported by the partition wall 18 through the angular ball bearings 52 and 52a.

A spacer 54 or 54a is disposed between an inner race of the bearing 52 or 52a and the output gear 32, and a shim 56 or 56a is disposed between the inner race and the first or second output disc 24 or 24a, so that the positioning between the first and second output discs 24 and 24a is achieved.

As is understood from the drawings, the paired traction rollers 26 or 26a are arranged at opposite sides with respect to the input shaft 12. As is seen from FIG. 2, each traction roller 26 or 26a has a curved peripheral portion which is operatively engaged with the toroidal surfaces of the input and output discs 22 and 24 (or, 22a and 24a).

The first and second paired traction rollers 26 and 26a are pivotally supported by first and second supporting mechanisms 58 and 58a respectively.

Since the first and second supporting mechanisms 58 and 58a are substantially the same in construction, the following description will be directed to only the second supporting mechanism 58a to avoid repeated explanation.

Figure 2:
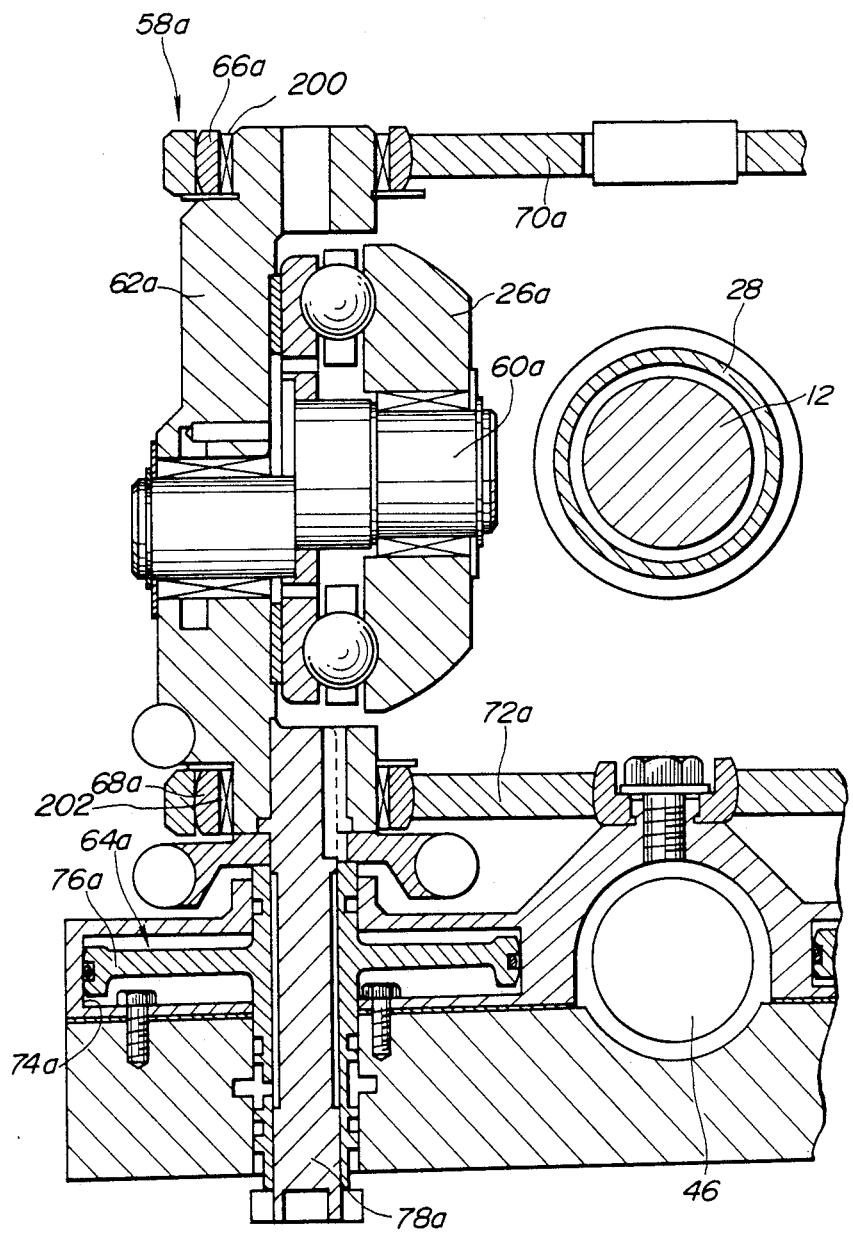
FIG. 2 is a sectional, but enlarged, view taken along the line 2—2 of FIG. 1.

Referring to FIG. 2, there is partially shown the second supporting mechanism 58a, which is a view taken along the line II—II of FIG. 1.

The second supporting mechanism 58a comprises two or left and right identical units (only left one is shown in FIG. 2) which are arranged at opposite sides with respect to the input shaft 12, each unit including an eccentric shaft 60a on which the traction roller 26a is rotatably supported, a supporting member 62a to which the eccentric shaft 60a is pivotally connected, and a hydraulic actuator 64a which moves the supporting member 62a in direction perpendicular to the axis of the eccentric shaft 60a.

A first portion of the eccentric shaft 60a on which the traction roller 26a is rotatably disposed and a second portion of the shaft 60a which is rotatably connected to the supporting member 62a are eccentric to each other. The eccentricity of one eccentric shaft 60a is reversed to that of the other eccentric shaft 60a.

Each supporting member 62a has upper and lower ends inclinably supported through spherical bearings 66a and 68a by upper and lower links 70a and 72a respectively. In addition, needle bearings 200 and 202 allow each supporting member 62a to rotate relative to upper and lower links 70a and 72a.

Each hydraulic actuator 64a comprises a cylinder 74a, a piston 76a and a piston rod 78a. The piston rod 78a is connected to the supporting member 62a to move together.

Due to the nature of the reversedly mounted eccentric shafts 60a, the two piston rods 78q of the respective units are moved in opposite directions in response to application of control hydraulic pressure from a second control valve (not shown).

Accordingly, when the two hydraulic actuators 64a are operated by the hydraulic pressure, the two supporting members 62a are moved in opposite directions and thus the upper and lower links 70a and 72a are inclined.

With this, the two traction rollers 26a disposed between the input and output discs 22a and 24a are inclined about respective axes which are parallel with the piston rods 78a of the hydraulic actuators 64a.

As has been described hereinafore, the first supporting mechanism 58 has substantially the same construction as the above-mentioned second supporting mechanism 58a. Thus, as will be understood from FIG. 1, when a hydraulic actuator (not shown) of the first supporting mechanism 58 is operated, the two traction rollers 26 are inclined in substantially the same manner as the traction rollers 26a of the second supporting mechanism 58a.

It is to be noted that since the first and second motion transmitting traction mechanisms 20 and 20a are arranged in a so-called mirror image manner, the corresponding parts of the first and second supporting mechanisms 58 and 58a are moved in opposite directions.

In the following, operation will be described with reference to the drawings.

For ease of understanding, the description will be commenced with respect to a rest condition of the transmission 10 wherein an engine incorporated with the transmission 10 is at a standstill and thus there is no torque applied to the input shaft 12.

Under this rest condition, the biasing force produced by the disc springs 100 and 102 is applied to the first and second input discs 22 and 22a, so that the first paired traction rollers 26 are pressed by the first input and output discs 22 and 24 with a relatively small biasing force, and at the same time, the second paired traction rollers 26a are pressed by the second input and output discs 22a and 24a with a relatively small biasing force.

When, upon starting of the engine, a certain torque is applied to the input shaft 12, the same is transmitted through the cam flange 34 and the loading cam structure 36 to the first input disc 22 and through the torque shaft 28 to the second input disc 22a inducing rotation of the first and second input discs 22 and 22a.

During the torque transmitting from the input shaft 12 to the first input disc 22, there is produced a relative but slight rotation (or phase shift) between the cam flange 34 and the first input disc 22 thereby turning the cam elements of the loading cam structure 36 about their axes increasing their effective widths. Thus, the first input disc 22 is biased toward the first output disc 24, and at the same time, the second input disc 22a is biased toward the second output disc 24a.

Accordingly, the pressing or contact force with which each toroidal disc 22, 24, 22a or 24a is pressed against the corresponding paired traction rollers 26 or 26a is increased and thus undesired slippage therebetween is suppressed or at least minimized.

Because of the provision of the needle thrust bearing 110 between the cam flange 34 and the disc spring 102, the relative rotation between the cam flange 34 and the first input disc 22, which occurs when a torque transmitting therebetween is about to start, is smoothly and instantly carried out without producing undesired trailed rotation of the first input disc 22 by the cam flange 34.

In fact, by the provision of the needle thrust bearing 110, the degree of friction between the cam flange 34 and the first input disc 22 is reduced to about one fiftieth as much as that of the aforementioned conventional transmission wherein a preloaded spring is compressed between the cam flange and the first input disc. Thus, the torque transmission from the cam flange 34 to the first input disc 22 is instantly achieved upon occurrence of a relative rotation between the cam flange 34 and the first input disc 22.

Figure 3:
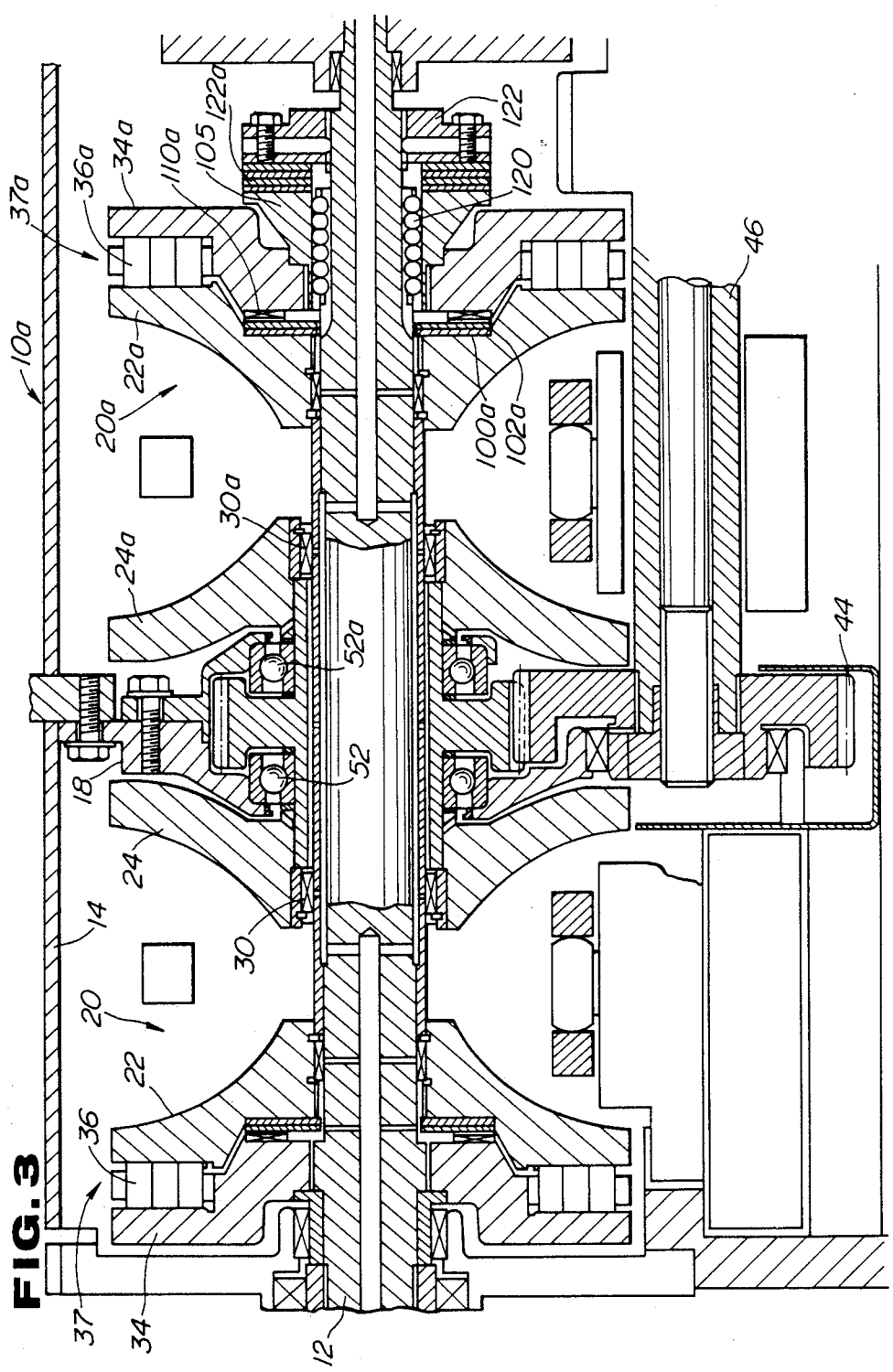
FIG. 3 is a view similar to FIG. 1, but showing a second embodiment of the present invention.

Referring to FIG. 3, there is shown a second embodiment 10a of the present invention. The parts and constructions identical to those in the above-mentioned first embodiment 10 are denoted by the same numerals.

For ease of description, only the parts and constructions which are different from those in the above-mentioned first embodiment 10 will be described in the following.

In the second embodiment 10a, an auxiliary loading cam structure 36a and an auxiliary cam flange 34a are further employed, which are arranged between the second input disc 22a and the input shaft 12. Thus, the transmission of torque from the input shaft 12 to the first input disc 22 and that from the input shaft 12 to the second input disc 22a are independently achieved by the respective loading cam structures 36 and 36a in this second embodiment 10a.

Between the cam flange 34a and the second input disc 22a, there are arranged two or paired disc springs 100a and 102a and a needle thrust bearing 110a in substantially the same manner as in the aforementioned first embodiment 10.

In the second embodiment 10a, the following measure is further employed in order to equalize the biasing forces applied to the first and second motion transmitting traction mechanisms 20 and 20a by the respective loading cam structures 36 and 36a, and those applied to the mechanisms 20 and 20a by the respective paired disc springs 100 and 102, and 100a and 102a.

That is, the auxiliary cam flange 34a is tightly disposed on a reduced diameter portion of a conical mount 105 which is axially movably mounted about the input shaft 12 through several sets of linear motion bearings 120, each set being received in an axially extending groove formed in the input shaft 12 as shown. Thus, the conical mount 105 and also the cam flange 34a which is tightly disposed on the conical mount 105 are latched to the input shaft 12 permitting an axial movement thereof relative to the same. In order to assure the connection between the cam flange 34a and the conical mount 105, a nut 122 carrying thereon spring washers 122a is screwed to the input shaft 12 in a manner to bias the conical mount 105 toward cam flange 34a.

Because of provision of the needle thrust bearing 110a between the cam flange 34a and the disc spring 102a, relative rotation between the cam flange 34a and the second input disc 22a, which occurs when a torque transmitting therebetween is about to start, is smoothly and instantly carried out without producing undesired trailed-rotation of the first input disc 22a by the cam flange 34a.

Although the above-mentioned embodiments are directed to an arrangement wherein the needle thrust bearing 110 or 110a is arranged between the cam flange 34 or 34a and the paired disc springs 100 and 102, or 100a and 102a which are attached to the input disc 22 or 22a, the present invention is not limited to such arrangement. For example, the needle thrust bearing 110 or 110a may be arranged between the input disc 22 or 22a and paired disc springs 100 and 102, or 100a and 102a which are attached to the cam flange 34 or 34a.

Although the above-description is directed to the double cavity type transmission, the invention is also applicable to a transmission having only one motion transmitting traction mechanism or more than two motion transmitting traction mechanisms.

What is claimed is:

1. A continuously variable traction roller transmission comprising:
   a casing;
   input and output shafts passing through the interior of said casing;
   a hollow torque shaft coaxially disposed about said input shaft to be rotatable about the same;
   opposite paired input and output toroidal discs, said input disc being coaxially and securedly disposed about said hollow torque shaft and said output disc being coaxially rotatably disposed about said hollow torque shaft;
   paired traction rollers disposed between and in engagement with said input and output discs;
   first means for connecting said input shaft to said input disc to achieve a united rotation of said input shaft and said input disc and biasing said input disc toward said output disc with a force variable in accordance with a magnitude of torque applied to said input shaft;
   second means disposed between said input shaft and said input disc for constantly biasing said input disc toward said output disc; and
   third means for reducing a friction force which is produced between said input disc and said input shaft by said second means when a relative rotation therebetween takes place, said third means being a thrust bearing disposed between said second means and one of said input shaft and said input disc,
   wherein said first and second means are arranged in parallel with each other between said input shaft and said input disc, and
   wherein said third means and said second means are arranged tandem between said input shaft and said input disc.

2. A continuously variable traction roller transmission as claimed in claim 1, in which said first means comprises a loading cam structure which is operatively disposed between a cam flange secured to said input shaft and said input disc.

3. A continuously variable traction roller transmission as claimed in claim 2, in which said second means comprises a spring structure which is operatively disposed between said cam flange and said input disc.

4. A continuously variable traction roller transmission as claimed in claim 3, in which said spring structure comprises paired disc springs which are coaxially disposed about said input shaft at a position between respective smaller diameter portions of said cam flange and said input disc.

5. A continuously variable traction roller as claimed in claim 4, in which said output disc is operatively connected to an output shaft through an output gear structure.

6. A continuously variable traction roller transmission of a double cavity type, comprising:
   a casing;
   a partition wall installed in said casing to define front and rear cavities in the same;
   an input shaft extending through said front and rear cavities;
   first and second motion transmitting traction mechanisms respectively installed in said front and rear cavities and disposed about said input shaft, each mechanism including opposite paired input and output toroidal discs and paired traction rollers disposed between and in engagement with the paired input and output toroidal discs;
   first means for connecting said input shaft to said input disc of each motion transmitting traction mechanism to achieve a united rotation of said input shaft and said input disc and biasing each said input disc toward the corresponding output disc in accordance with a magnitude of torque applied to said input shaft;
   second means disposed between said input shaft and said input disc of each motion transmitting traction mechanism in parallel with said first means for constantly biasing each said input disc toward the corresponding output disc;
   third means for reducing a friction force which is produced between said input shaft and said input disc of each motion transmitting traction mechanism by said second means when a relative rotation therebetween takes place; and wherein
   said third means comprises a needle thrust bearing arranged in tandem with said second means between said input shaft and said input disc.

7. A continuously variable traction roller transmission as claimed in claim 6, in which said first means comprises a loading cam structure which is operatively disposed between a cam flange secured to said input shaft and the input disc of each motion transmitting traction mechanism, and in which said second means comprises a spring structure which is operatively disposed between said cam flange and said input disc of each motion transmitting traction mechanism.

8. A continuously variable traction roller transmission as claimed in claim 7, in which said spring structure of the second means comprises paired disc springs which are coaxially disposed about said input disc at a position between respective smaller diameter portions of said cam flange and said input disc.

9. A continuously variable traction roller transmission as claimed in claim 8, in which the input discs of the first and second motion transmitting traction mechanisms are coaxially mounted on and secured to a hollow torque shaft which is coaxially and rotatably disposed about said input shaft, and in which the output discs of the traction mechanisms are coaxially and rotatably disposed about& said hollow torque shaft.

10. A continuously variable traction roller transmission as claimed in claim 9, in which said output discs are positioned close to each other having said partition wall positioned therebetween.

11. A continuously variable traction roller transmission as claimed in claim 10, in which said output discs are operatively connected through an output gear structure to an output shaft which extends through only said rear cavity.

12. A continuously variable traction roller transmission as claimed in claim 11, in which said output gear structure is supported by said partition wall.

* * * * *